(12) United States Patent
Huang et al.

(10) Patent No.: US 11,056,078 B2
(45) Date of Patent: Jul. 6, 2021

(54) MULTI-SCREEN COLOR CORRECTION METHOD AND ELECTRONIC DEVICE USING THE SAME

(71) Applicant: ASUSTeK COMPUTER INC., Taipei (TW)

(72) Inventors: Yi-Han Huang, Taipei (TW); Chin-An Tseng, Taipei (TW); Hung-Wen Chang, Taipei (TW); Yi-Han Tu, Taipei (TW); Yung-Ming Huang, Taipei (TW); Chia-Lei Yu, Taipei (TW)

(73) Assignee: ASUSTEK COMPUTER INC, Taipei (TW)

( * ) Notice: Subject to any disclaimer, the term of this patent is extended or adjusted under 35 U.S.C. 154(b) by 0 days.

(21) Appl. No.: 16/881,245

(22) Filed: May 22, 2020

(65) Prior Publication Data

US 2020/0388243 A1    Dec. 10, 2020

(30) Foreign Application Priority Data

Jun. 6, 2019    (CN) .......................... 201910489231.6

(51) Int. Cl.
*G09G 5/10*    (2006.01)
*G09G 5/04*    (2006.01)

(52) U.S. Cl.
CPC ................ *G09G 5/10* (2013.01); *G09G 5/04* (2013.01); *G09G 2320/0626* (2013.01); *G09G 2320/0666* (2013.01); *G09G 2320/0686* (2013.01)

(58) Field of Classification Search
CPC .......... G09G 3/06; G09G 3/20; G09G 3/2003; G09G 5/04; G09G 5/10; G09G 2320/02; G09G 2320/0242; G09G 2320/0626; G09G 2320/0666; G09G 2320/0686; G09G 2320/0693; G09G 2370/42; G06F 3/1423; G01M 11/02
See application file for complete search history.

(56) References Cited

U.S. PATENT DOCUMENTS 5,670,985 A * 9/1997 Cappels, Sr. ....... G06F 3/04897
345/207
5,956,015 A * 9/1999 Hino ........................ G09G 5/02
345/600

(Continued)

FOREIGN PATENT DOCUMENTS

CN      102026003 B     8/2012
CN      107221306 A     9/2017

*Primary Examiner* — Joe H Cheng
(74) *Attorney, Agent, or Firm* — McClure, Qualey & Rodack, LLP (57) ABSTRACT

A multi-screen color correction method and an electronic device are provided. The multi-screen color correction method is adapted with an electronic device with at least two display panels, and includes the following steps: obtaining image characteristics of test images displayed on the display panels respectively; performing a parameter operation on the image characteristics separately to obtain image correction parameters correspondingly; correcting colors of the display panels respectively according to the image correction parameters; obtaining luminance characteristics of the display panels by calculating based on the image correction parameters; and adjusting the luminance of the display panels according to the luminance characteristics.

16 Claims, 5 Drawing Sheets

(56) References Cited

U.S. PATENT DOCUMENTS

| | | | |
|---|---|---|---|
| 6,504,551 B1* | 1/2003 | Takashima | H04N 1/60 |
| | | | 345/649 |
| 6,611,249 B1* | 8/2003 | Evanicky | G01J 3/02 |
| | | | 345/102 |
| 6,614,555 B1* | 9/2003 | Hidaka | H04N 1/6052 |
| | | | 358/1.9 |
| 9,019,253 B2* | 4/2015 | Drzaic | G09G 5/02 |
| | | | 345/207 |
| 9,332,158 B2* | 5/2016 | Mori | H04N 1/6033 |
| 10,134,321 B2* | 11/2018 | Itakura | G09G 3/342 |
| 10,410,590 B2* | 9/2019 | Comps | H04N 9/73 |
| 10,446,091 B2* | 10/2019 | Park | G09G 3/3413 |
| 2003/0142879 A1* | 7/2003 | Kim | H04N 1/628 |
| | | | 382/274 |
| 2008/0260246 A1* | 10/2008 | Suzuki | H04N 1/6086 |
| | | | 382/167 |
| 2009/0141042 A1* | 6/2009 | Shannon | G01J 3/51 |
| | | | 345/600 |
| 2010/0073340 A1* | 3/2010 | Morimoto | G09G 5/02 |
| | | | 345/207 |
| 2010/0156925 A1* | 6/2010 | Ahn | G09G 3/3611 |
| | | | 345/589 |
| 2013/0010009 A1* | 1/2013 | Kirchner | G09G 5/02 |
| | | | 345/690 |

* cited by examiner

MULTI-SCREEN COLOR CORRECTION METHOD AND ELECTRONIC DEVICE USING THE SAME

CROSS-REFERENCE TO RELATED APPLICATION

This application claims the priority benefit of Chinese application serial No. 201910489231.6 filed on Jun. 6, 2019. The entirety of the above-mentioned patent application is hereby incorporated by reference herein and made a part of specification.

BACKGROUND OF THE INVENTION

Field of the Invention

The invention relates to a correction method, more particular, relates to a multi-screen color correction method for an electronic device.

Description of the Related Art

In general, the displaying differences between panels of a multi-screen electronic device might be happened even they are produced by the same manufacturer. The differences in chrominance and luminance displayed by multiple panels are easily detectable by human eyes. When the colors of pictures or images displayed on the multi-screen of the electronic device have differences, users might feel inconsistent and discontinuous when viewing the electronic device, and the visual perception is not well.

BRIEF SUMMARY OF THE INVENTION

According to the first aspect, a multi-screen color correction method is provided. The multi-screen color correction method is adapted with an electronic device with at least two display panels, and includes the following steps: obtaining image characteristics of test images displayed on the display panels respectively; performing a parameter operation on the image characteristics separately to obtain image correction parameters correspondingly; correcting colors of the display panels respectively according to the image correction parameters; obtaining luminance characteristics of the display panels by calculating based on the image correction parameters; and adjusting the luminance of the display panels according to the luminance characteristics.

According to the first aspect, an electronic device connected to a sensor is provided. The electronic device includes: at least two display panels; and a processor, electrically connected to the display panels, and the processor controls the display panels to display a test image respectively; wherein, the processor obtains image characteristics corresponding to the test image displayed on the display panels through the sensor, and performs a parameter operation on the image characteristics, respectively, to obtain corresponding image correction parameters and correct the chrominance of the display panels separately according to the image correction parameters; and the processor calculates according to the image correction parameters to obtain the corrected luminance characteristics of the display panels, and adjusts the luminance of the display panels according to the luminance characteristics.

In summary, the multi-screen color correction method and the electronic device in the disclosure perform color difference minimization adjustment on multiple panels, which reduces the display differences between the panels, maintains the consistency and continuity of the display effects of the electronic device, and also provides users with a better visual perception.

These and other features, aspects and advantages of the present invention will become better understood with regard to the following description, appended claims, and accompanying drawings.

DETAILED DESCRIPTION OF THE EMBODIMENTS

Figure 1:
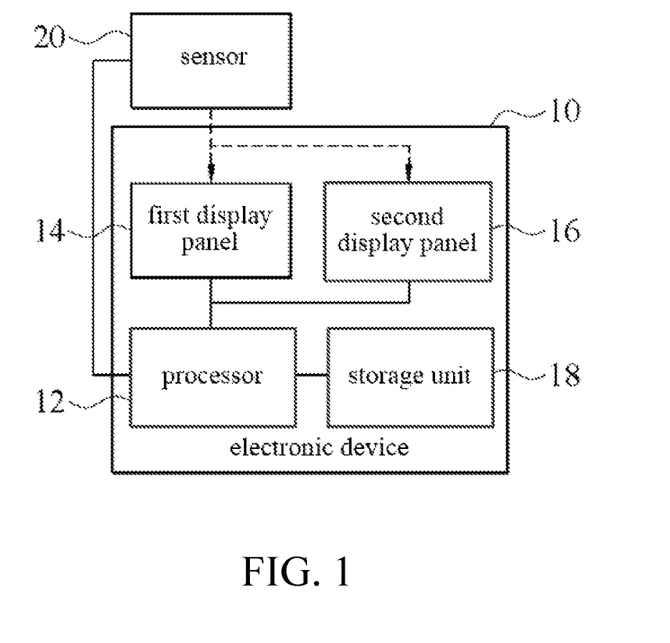
FIG. 1 is a schematic circuit block diagram of an electronic device according to an embodiment.

FIG. 1 is a schematic circuit block diagram of an electronic device according to an embodiment. Please refer to FIG. 1. An electronic device 10 with multiple panels is connected with a sensor 20. The electronic device 10 includes a processor 12, two display panels 14, 16, and a storage unit 18. In an embodiment, the electronic device 10 includes a first display panel 14 and a second display panel 16, which is not limited here. In other embodiment, the electronic device 10 include more than display panels according to actual needs. In some embodiments, the electronic device 10 is, but is not limited to, a mobile phone, a notebook computer, a tablet computer, a personal digital assistant (PDA), or the like.

The processor 12 is electrically connected to the first display panel 14, the second display panel 16, and the storage unit 18. The processor 12 controls the test images displayed on the first display panel 14 and the second display panel 16, respectively. The processor 12 obtains image characteristics corresponding to the test images displayed on the first display panel 14 and the second display panel 16 through the sensor 20. The processor 12 performs the parameter operation processing on the image characteristics to obtain the corresponding image correction parameters, and corrects the colors of the first display panel 14 and the second display panel 16 respectively according to the image correction parameters. In an embodiment, each image characteristics includes chrominance information and luminance information, and each image correction parameters includes a chrominance correction parameter and a luminance correction parameter. The storage unit 18 stores the image characteristics and the image correction parameters. In some embodiments, the sensor 20 is, but is not limited to, a color sensor.

Figure 2:
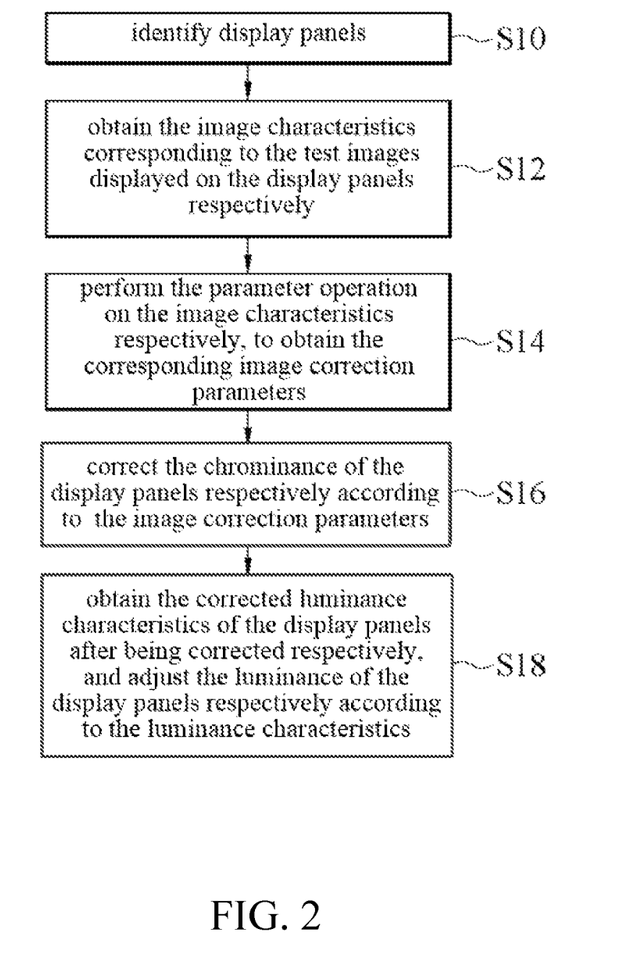
FIG. 2 is a schematic flowchart of performing multi-screen color correction according to an embodiment.
Figure 3:
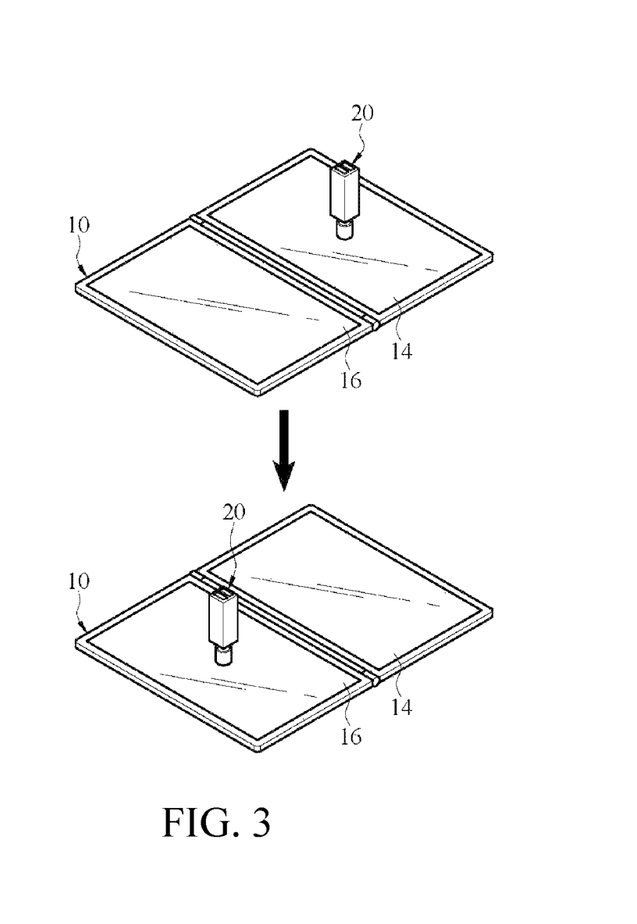
FIG. 3 is a schematic diagram of measuring an electronic device according to an embodiment.
Figure 4:
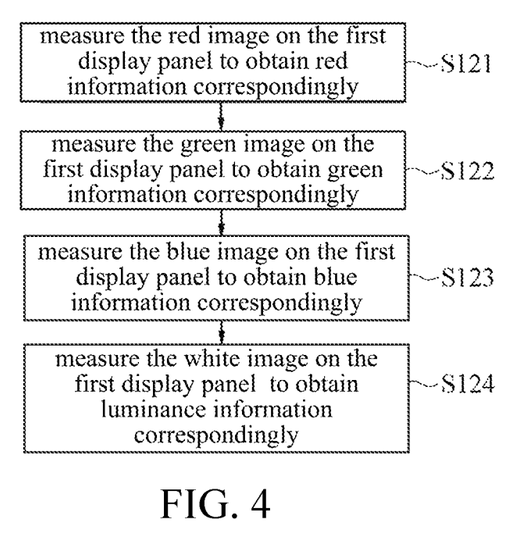
FIG. 4 is a schematic flowchart of measuring test images according to an embodiment.

As shown in FIG. 1 to FIG. 3, the electronic device 10 has the first display panel 14 and the second display panel 16. In one embodiment, the electronic device 10 is a notebook computer with two display panels 14 and 16, is used as an example to describe the entire color correction method.

In step S10, the processor 12 of the electronic device 10 first identifies the first display panel 12 and the second display panel 14 of the electronic device 10. In an embodiment, the processor 12 identifies the first display panel 12 and the second display panel 14 by extended display identification data (EDID), a system interface, or a panel number. Since the optical information of each display panel 12 and 14 is different and the adjusted parameters are also different, different display panels need to be clearly distinguished in order to use correct parameters.

In step S12, sequentially measure the test images displayed on the first display panel 14 and the second display panel 16 respectively through a sensor 20, to obtain the image characteristics corresponding to the test images displayed on the first and the second display panels 14, 16 respectively. Each of the image characteristics includes chrominance information and luminance information. In an embodiment, the sensor 20 is configured to aim at the test image in a visual effects center area of the first display panel 14 and cling to the surface of the first display panel 14 to avoid the image characteristic from ambient light interference and obtain the image characteristics of the first display panel 14 (first image characteristics); then the sensor 20 is configured to aim at the test image in the visual effects center area of the second display panel 16 to obtain the image characteristics of the second display panel 16 (second image characteristics). In one embodiment, the first image characteristics and the second image characteristics measured by the sensor 20 are transmitted to the processor 12 and stored in the storage unit 18 of the electronic device 10.

In step S14, the processor 12 separately performs the parameter operation on the image characteristics measured by the sensor 20, to obtain the corresponding image correction parameters. The image characteristics includes the first image characteristics and the second image characteristics, and each of the image correction parameters includes a chrominance correction parameter and a luminance correction parameter. The image correction parameters obtained through the operation of the processor 20 are also stored in the storage unit 18. When performing the parameter operation, the parameter operation is different according to different calculation standards, which will be described later.

As step S16, the processor 12 corrects the chrominance of the first display panel 14 and the second display panel 16 respectively according to the image correction parameters obtained by the above operations.

As step S18, after correcting the chrominance of the first display panel 14 and the second display panel 16, the processor 12 performs calculations based on the image correction parameters to obtain the luminance characteristics of the first display panel 14 and the second display panel 16, respectively, and adjusts the luminance of the first display panel 14 or the second display panel 16 respectively according to the luminance characteristics, to achieve a uniform luminance correction result.

In the following specific embodiment, four test images are used as examples to explain the details of the sensor measuring the image characteristics and the subsequent parameter operation and color correction processes. The four test images include a red image, a green image, a blue image, and a white image, but the number, order, and color of the test images are not intended to limit the application.

Please refer to FIG. 1 to FIG. 4. When the test image is displayed on the display panel 14, press the sensor 20 to cling to the test image shown on the surface of the first display panel 14, as shown in steps S121 to S124. At this time, when the processor 12 controls the first display panel 14 to display the red image, the sensor 20 measures the red image displayed on the first display panel 14 to obtain red information R1 corresponding to the red image (step S121); when the processor 12 controls the first display panel 14 to display the green image, the sensor 20 measures the green image displayed on the first display panel 14 to obtain green information G1 corresponding to the green image (step S122); when the processor 12 controls the first display panel 14 to display the blue image, the sensor 20 measures the blue image displayed on the first display panel 14 to obtain blue information B1 corresponding to the blue image (step S123); and when the processor 12 controls the first display panel 14 to display the white image, the sensor 20 measures the white image displayed on the first display panel 14 to obtain the luminance information W1 corresponding to the white image (step S124). The first image characteristics of the first display panel 14 described above includes the luminance information W1 and the chrominance information comprising red information R1, green information G1, and blue information B1. Next, move the sensor 20 to another display panel 16 and press the sensor 20 to cling to the surface of the second display panel 16 also as shown in steps S121 to S124. At this time, the processor 12 controls the second display panel 16 to sequentially display the red image, the green image, the blue image, and the white image, and the sensor 20 measures the red image, the green image, the blue image, and the white image displayed on the second display panel 16 to obtain the red information R2 corresponding to the red image, the green information G2 corresponding to the green image, the blue information B2 corresponding to the blue image, and the luminance information W2 corresponding to the white image. The second image characteristics of the second display panel 16 described above includes the luminance information W2 and the chrominance information comprising the red information R2, the green information G2, and the blue information B2. After obtaining the first image characteristics of the first display panel 14 and the second image characteristics of the second display panel 16, the subsequent parameter operation and color correction process are executed sequentially.

In an embodiment, since the storage unit 18 stores a color reference standard, and the color reference standard includes a chrominance reference standard and a luminance reference standard, the processor 12 obtains the color reference standard from the storage unit 18, and calculates the first image characteristics (R1, G1, B1, W1) of the first display panel 14 and the second image characteristics (R2, G2, B2, W2) of the second display panel 16 according to the color reference standard, to obtain the first image correction parameters of the first display panel 14 and the second image correction parameters of the second display panel 16. In detail, the processor 12 calculates the difference between the first image characteristics and the color reference standard in chrominance and luminance, and the difference between the second image characteristics and the color reference standard in chrominance and luminance, to obtain the first image correction parameters corresponding to the first display panel 14 and the second image correction parameters corresponding to the second display panel 16 (step S14). Then, the processor 12 adjusts the color of the first display panel 14 according to the first image correction parameters of the first display panel 14 and adjusts the color of the second display panel 16 according to the second image correction parameters of the second display panel 16, to generate the adjusted chrominance value and the adjusted luminance value of the first display panel 14 and the second display panel 16, respectively, which causes the colors of the first display panel 14 and the second display panel 16 to be adjusted close to the color reference standard to reduce the color difference between the first display panel 14 and the second display panel 16 (step S16).

In an embodiment, after adjusting the colors of the first display panel 14 and the second display panel 16 to be close to the color reference standard, the processor 12 performs a calculation based on the first image correction parameters and the second image correction parameters to obtain the first luminance characteristics of the first display panel 14 and the second luminance characteristics of the second display panel 16, and then the processor 12 selects the luminance characteristics with the minimum luminance value from the first luminance characteristics and the second luminance characteristics as a luminance correction reference. When the value of the first luminance characteristics of the first display panel 14 is the minimum luminance value, the first luminance characteristics with the minimum luminance value is selected as the luminance correction reference, and the luminance of the second display panel is adjusted according to the luminance correction reference 16. In detail, the processor 12 calculates the difference of the luminance value between the second luminance characteristics and the first luminance characteristics with the minimum luminance value, to obtain the luminance characteristics correction parameters of the second display panel 16. Then, the processor 12 adjusts the luminance value of the second display panel 16 according to the luminance characteristics correction parameters of the second display panel 16, so that the adjusted luminance value of the second display panel 16 approaches the minimum luminance of the first display panel 14. Furthermore, the color difference between the first display panel 14 and the second display panel 16 is reduced to achieve the correction effect (As in step S18).

In the above embodiment, the measurement is performed on the red image, the green image, the blue image, and the white image. In other embodiments, besides the red image, the green image, the blue image, and the white image, the measurement also is performed on other test images selected according to actual needs, to obtain more information as the image characteristics, which is not limited herein.

In an embodiment, the first luminance characteristics and the supply current of the first display panel 14 have a linear relationship, the second luminance characteristics and the supply current of the second display panel 16 also have a linear relationship, and the luminance characteristics correction parameter is a current correction parameter. In an embodiment, when the value of the first luminance characteristics of the first display panel 14 has the minimum luminance value, the first luminance characteristics is selected as the luminance correction reference, and the processor 12 calculates the difference of the luminance value between the second luminance characteristics and the first luminance characteristics with the minimum luminance value, to obtain the current correction parameters corresponding to the second display panel 16, and then adjusts the supply current of the second display panel 16 according to the current correction parameter, so that the luminance value of the second display panel 16 is reduced to be equal to the luminance value of the first display panel 14 to minimize the difference between the first display panel 14 and the second display panel 16 in luminance.

Figure 5:
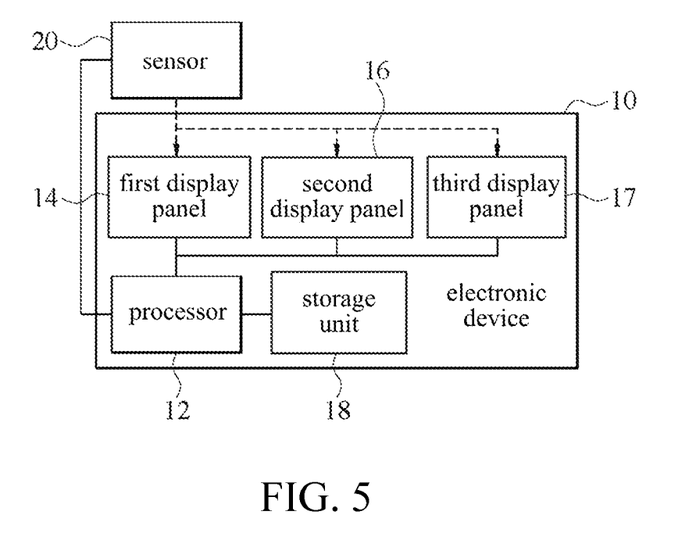
FIG. 5 is a schematic circuit block diagram of an electronic device according to another embodiment.
Figure 6:
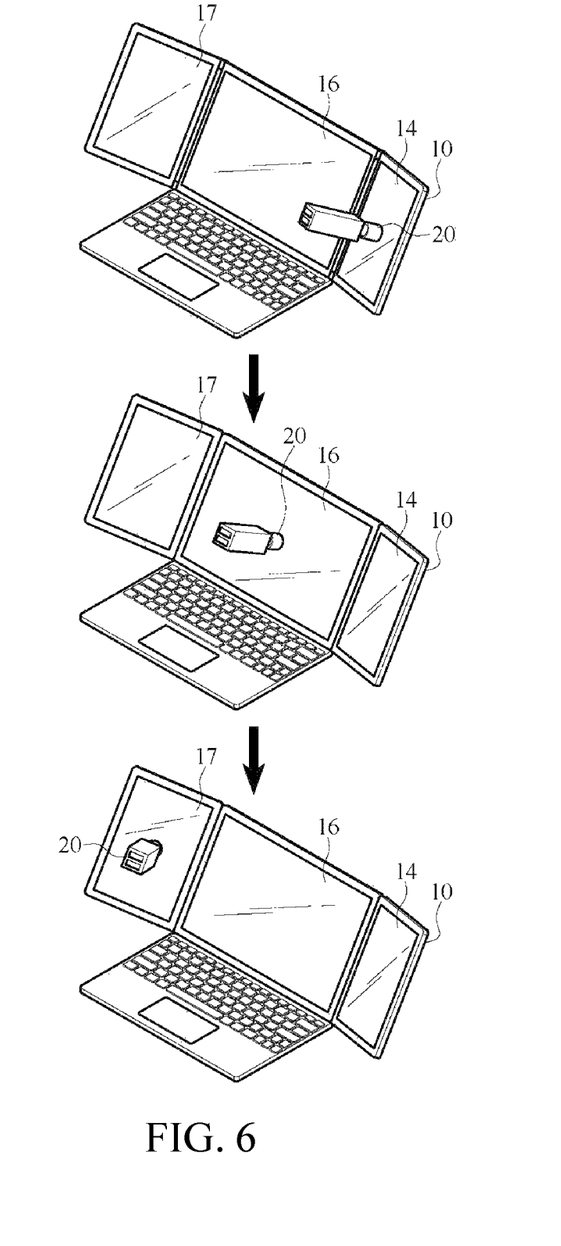
FIG. 6 is a schematic diagram of measuring an electronic device according to another embodiment.

In the foregoing embodiments, the electronic device with two display panels are used to describe the structural relationship and operation of the entire electronic device in detail, and the color correction of the two display panels is also used as an example, however, the number and settings of the display panels are determined by actual needs. In other embodiments, the electronic device has three display panels, as shown in FIG. 5 and FIG. 6. In the electronic device 10, the processor 12 is electrically connected to the first display panel 14, the second display panel 16 and the third display panel 17, and the sensor 20 sequentially measures the test images displayed on the first display panel 14, the second display panel 16 and the third display panel 17, to obtain the first image characteristics (R1, G1, B1, W1) corresponding to the first display panel 14, the second image characteristics (R2, G2, B2, W2) corresponding to the second display panel 16, and the third image characteristics (R3, G3, B3, W3) corresponding to the third display panel 17, and perform the subsequent the parameter operation and color correction separately according to the first image characteristics, the second image characteristics and the third image characteristics. The detailed process, function, and effect are the same as those of the previous embodiment, so they are not repeated here.

In some embodiments, the color correction method is performed through an operating system in the electronic device or a setting interface generated by an application installed in the electronic device, which is not limited herein.

In some embodiments, before the electronic device leaves the factory, in the original factory, the multi-screen color correction method is performed on the display panels, and the specific color setting values (chrominance value and luminance value) after correction can also be set to the factory default values. In addition, the user can selectively adjust the screen setting values according to personal habits to meet personal needs.

Therefore, the multi-screen color correction method and the electronic device disclosed herein are configured to minimize the color difference values of multiple the display panels of the electronic device, reduce the display differences between the display panels, and maintain the consistency and continuity of the display effect, which allows the multiple display panels adjusted by the color correction to provide users with better visual perception.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An multi-screen color correction method, adapted with an electronic device with at least two display panels, the multi-screen color correction method includes the following steps:

obtaining image characteristics of test images displayed on the display panels respectively;

performing a parameter operation on the image characteristics separately to obtain image correction parameters correspondingly;

correcting colors of the display panels respectively according to the image correction parameters;

obtaining luminance characteristics of the display panels by calculating based on the image correction parameters; and adjusting the luminance of the display panels according to the luminance characteristics.

2. The multi-screen color correction method according to claim 1, the step of performing the parameter operation on the image characteristics separately to obtain the image correction parameters correspondingly further comprising:

obtaining a color reference standard; and calculating the image characteristics of the two display panels respectively according to the color reference standard to obtain the image correction parameters of the two display panels.

3. The multi-screen color correction method according to claim 1, the step of adjusting the luminance of the display panels according to the luminance characteristics further comprising:

when the luminance characteristics of one of the display panels has a minimum luminance value, the luminance characteristics with the minimum luminance value are used as a luminance correction reference; and adjusting the luminance of the other display panel in the two display panels according to the luminance correction reference.

4. The multi-screen color correction method according to claim 1, the image characteristics include chrominance information and luminance information, and each of the image correction parameters includes corresponding chrominance correction parameter and luminance correction parameter.

5. The multi-screen color correction method according to claim 4, the test images include a red image, a green image, a blue image, and a white image, the chrominance information is obtained from the red image, the green image, and the blue image, and the luminance information is obtained from the white image.

6. The multi-screen color correction method according to claim 1, the luminance characteristics and supply current of each of the display panels have a linear relationship.

7. The multi-screen color correction method according to claim 1, a sensor measures each of the test images on a visual effects center area of each of the display panels to obtain the corresponding image characteristics.

8. The multi-screen color correction method according to claim 1, the image characteristics and the image correction parameters are stored in a storage unit of the electronic device.

9. An electronic device, connected to a sensor, the electronic device including:

at least two display panels; and a processor, electrically connected to the display panels, and the processor controls the display panels to display a test image respectively;

wherein, the processor obtains image characteristics corresponding to the test image displayed on the display panels through the sensor, and performs a parameter operation on the image characteristics, respectively, to obtain corresponding image correction parameters and correct the chrominance of the display panels separately according to the image correction parameters; and the processor calculates according to the image correction parameters to obtain the corrected luminance characteristics of the display panels, and adjusts the luminance of the display panels according to the luminance characteristics.

10. The electronic device according to claim 9, wherein the image characteristics include chrominance information and luminance information, and each of the image correction parameters includes a chrominance correction parameter and a luminance correction parameter.

11. The electronic device according to claim 10, wherein the test images include a red image, a green image, a blue image, and a white image, and the chrominance information is obtained from the red image, the green image, and the blue image, and the luminance information is obtained from the white image.

12. The electronic device according to claim 9, wherein the luminance characteristics and supply current of each of the display panels have a linear relationship.

13. The electronic device according to claim 9, wherein the sensor measures the test image on a visual effects center area of each of the display panel to obtain the corresponding image characteristic.

14. The electronic device according to claim 9, wherein the parameter operation further comprising:

separately calculating the image characteristics of the two display panels by a color reference standard to obtain the image correction parameters of the two display panels.

15. The electronic device according to claim 9, wherein the luminance characteristics of one of the display panels with a minimum luminance characteristics is selected as a reference to adjust the luminance of other display panels.

16. The electronic device according to claim 9, wherein the electronic device further comprises: a storage unit, electrically connected to the processor to store the image characteristics and the image correction parameters.

* * * * *